April 26, 1949.    D. E. WILCOX    2,468,150
COMPUTER
Filed Nov. 6, 1945    3 Sheets-Sheet 1

INVENTOR.
DOYLE E. WILCOX
BY Christie & Angus
ATTORNEYS.

April 26, 1949.   D. E. WILCOX   2,468,150
COMPUTER

Filed Nov. 6, 1945   3 Sheets-Sheet 3

INVENTOR.
DOYLE E. WILCOX
BY Christie & Angus
ATTORNEYS.

Patented Apr. 26, 1949

2,468,150

UNITED STATES PATENT OFFICE 2,468,150

COMPUTER

Doyle E. Wilcox, Pasadena, Calif., assignor to Consolidated Engineering Corporation, Pasadena, Calif., a corporation of California Application November 6, 1945, Serial No. 627,050

6 Claims. (Cl. 235—61)

This invention relates to electrical computing systems and particularly to systems for ascertaining unknown quantities in mathematical equations.

The principal object is to provide an electrical system capable of arriving at the mathematical solutions of equations which have been difficult to solve by previously known electrical systems.

My invention provides an improvement in the use of electrical computers of the iterative type; and enables sets of linear simultaneous equations which are slow or impossible to converge by the iterative method, to be converged to a solution in a non-iterative manner.

My invention is useful, for example, with electrical computers of the type disclosed and claimed in the co-pending applications of Clifford E. Berry, Serial No. 561,192, filed October 31, 1944, now abandoned, and Serial No. 610,457, filed August 13, 1945, and my own co-pending application Serial No. 614,550, filed September 5, 1945, now Patent No. 2,417,098, issued March 11, 1947, all assigned to the same assignee as the present application.

In the said co-pending applications, there are disclosed systems for solving simultaneous mathematical equations comprising arrangements of potentiometers having electrical voltage supplies connected with them. These systems comprise a number of multiplying combinations of potentiometers, or voltage dividers upon which the multiplications called for in the equations are performed. The additions called for by the equations are performed by an addition network provided with an electrical indicator for indicating when the addition called for has been performed.

These prior systems are operated by setting up on the appropriate potentiometers the values of all the known quantities in the simultaneous equations, and then setting the potentiometers representing the unknowns to produce a balance on the addition system as called for by the addition of the equation. The unknowns of the plurality of equations are successively solved for in this way, and the cycle is repeated until an ultimate value for the unknowns fits all the equations.

It has been found that in the use of the foregoing systems, there are some kinds of equations that do not readily converge to a solution, so that it has been impossible or almost impossible to arrive at an ultimate set of values for the unknowns fitting all the equations. According to my present invention, I provide means adapted to be used with systems disclosed in said prior applications whereby such stubborn equations can be brought to solution.

A feature of my invention is the provision of a pair of potentiometers in multiplying relation with each other in addition to the multiplying potentiometer combinations corresponding to quantities in the equations. This extra multiplying combination is arranged to have its final voltage added in the addition system. I have found that by setting up voltage values on my additional novel multiplying combination in correspondence with the parameters of the equations, as will be hereinafter described in greater detail, equations of the stubborn type may be converged to a solution.

The invention will be better understood from the following detailed description and the accompanying drawings of which:

Fig. 1 shows an electrical computing system of the iterative type which is the same as described in my said co-pending application Serial No. 614,550, except that the elements included in the dotted rectangle G are not shown in my said prior application. These elements enclosed in rectangle G involve the novel features of my present invention.

Figure 1:
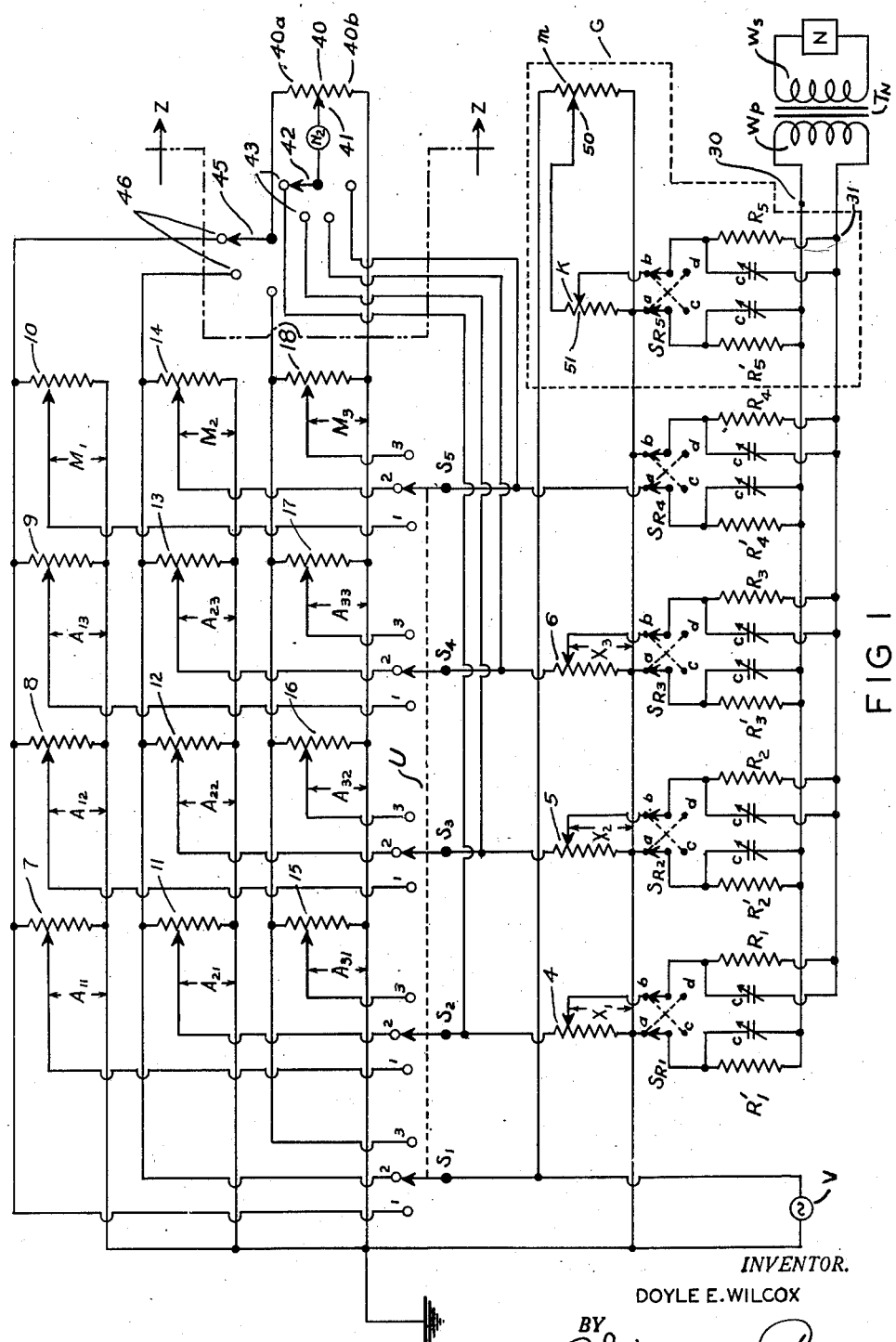
Fig. 1 shows a computer embodying my invention.

To enable my present invention to be readily understood, an explanation of this computer of my said prior application is given as follows: The system is adapted to solve for the three unknowns $X_1$, $X_2$ and $X_3$ in the following simultaneous equations:

$$A_{11}X_1 + A_{12}X_2 + A_{13}X_3 = M_1 \quad (1)$$
$$A_{21}X_1 + A_{22}X_2 + A_{23}X_3 = M_2 \quad (2)$$
$$A_{31}X_1 + A_{32}X_2 + A_{33}X_3 = M_3 \quad (3)$$

in which all of the quantities except $X_1$, $X_2$ and $X_3$ are known. The system comprises groups of potentiometers having impressed thereon an alternating voltage from a source V. Some of the potentiometers are arranged to represent the known quantities which are set up on their corresponding potentiometers as voltage ratios and others of the potentiometers represent the unknown quantities, the values of which may be read as the voltage ratio which is tapped off on the corresponding potentiometers. More particularly, the unknown quantity $X_1$ is represented by the proportion of the voltage across potentiometer 4 which exists between ground and the tap on the potentiometer. The unknown quantity $X_2$ is represented by the proportion of the voltage across potentiometer 5, which exists between ground and the potentiometer tap. The unknown quantity $X_3$ is represented by the proportion of the voltage across potentiometer 6 which exists between ground and the potentiometer tap.

The set of potentiometers 7, 8, 9 and 10 are for the known quantities of Equation 1, the quantity $A_{11}$ being represented by the proportion of the voltage across potentiometer 7 between the tap and ground, and the other known quantities being similarly marked on their respective potentiometers. In a similar fashion, the set of potentiometers 11, 12, 13 and 14 represents the known quantities of Equation 2, and the set of potentiometers 15, 16, 17 and 18 is for the known quantities in Equation 3 as marked on the potentiometers.

Five multiple switches, $S_1$, $S_2$, $S_3$, $S_4$ and $S_5$ are used, each having three contact points or switch positions 1, 2 and 3. The switches are adapted to be thrown in unison by a single control member U so that all the switch points are on either position 1, 2 or 3. When the switches are thrown to their position 1, only Equation 1 is being computed, and similarly when the switches are thrown to positions 2 or 3, only Equation 2 or 3, respectively, is being considered. In whichever position the switches are thrown, the voltage at the tap of each X potentiometer is proportional to the product of the ratio set on the X potentiometer and the ratio set on the A potentiometer.

Assume now that the switches are thrown to their positions 1. The potentiometers 7, 8, 9 and 10 are connected in parallel across voltage V; and the adjustable taps of these potentiometers are so set that the ratio of the voltage between ground and the tap to the total voltage across the potentiometer is equal to the known A or M value.

For this purpose it is convenient to consider the A and M values as decimal quantities which are fractions of unity; and if they are not already fractional values the equations may all be multiplied through by a constant which will make them all fractions. Then the said voltage ratios can be set to be equal numerically to the corresponding fractions. If the voltage across all the A potentiometers (and the M potentiometers) be made 1 volt, for example, the fraction will be numerically equal to the voltage between ground and the tap of the respective potentiometer.

By reason of the connection of each tap through the respective one of the switches $S_1$, $S_2$, $S_3$ and $S_4$, the voltages representing the A coefficients are applied across the respective potentiometers 4, 5 and 6. In consequence, the proportion of the voltage between ground and the taps of these latter potentiometers will represent the unknown quantities $X_1$, $X_2$ or $X_3$, by which the known coefficients are multiplied in the equation. Considering now the first of the equations, $$A_{11}X_1 + A_{12}X_2 + A_{13}X_3 = M_1 \qquad (1)$$

it is only required that the unknown quantities $X_1$, $X_2$ and $X_3$ be mutually adjusted so that the sum of voltages representing the three quantities at the left of the equality sign be equal to the quantity at the right of the equality sign.

This addition is performed by means of an addition system of the type described in my said copending application, comprising the equal resistors $R_1$, $R_2$, $R_3$, $R_4$, and $R_1'$, $R_2'$, $R_3'$, $R_4'$. It will be noted that the voltages which are to be added according to the summation called for by Equation 1 are the voltages between ground and the taps of potentiometers 4, 5, 6 and 10, respectively. There are two of these R resistors attached to each of the potentiometers 4, 5, 6 and 10. The potentiometer 4, for example, has a resistor $R_1$ connectable to its tap and another resistor $R_1'$ connected to the grounded terminal. Likewise the potentiometers 5, 6 and 10 have connected to their grounded terminals, resistors $R_2'$, $R_3'$, $R_4'$, respectively, in addition to the respective resistors $R_2$, $R_3$ and $R_4$ respectively. Accordingly, there is a pair of the high resistors, that is, an R and an R' resistor for each X potentiometer, these being on each side of the tapped off portion of the voltage from the X potentiometer. These R and R' resistors are attached to the opposite terminals 30 and 31 of the primary winding $W_p$ of transformer $T_n$, the secondary $W_s$ of which has connected across it a null voltage indicator N.

It will be observed that the R and R' resistors are not connected directly to their corresponding unknown potentiometers, but through the respective reversing switches $S_{R1}$, $S_{R2}$, $S_{R3}$, or $S_{R4}$. Each of the reversing switches comprises two upper contacts $a$ and $b$, respectively, and two lower contacts $c$ and $d$, respectively. When the reversing switches are all thrown to their upper pair of contacts $a$, $b$, the R resistor of the pair is connected to the upper side of the primary of the transformer $T_n$, and the R' of the pair is connected to the lower terminal of the transformer winding. When on the other hand, any of the reversing switches is thrown to its lower contact $c$, $d$, respectively, the polarity of the voltage from the respective unknown potentiometers is applied to the transformer $T_n$ in the opposite polarity. The summation called for by the equation is had when the two terminals 30 and 31 of the primary $W_p$ are at the same voltage, no current flows through the transformer. This condition will be indicated by a null reading on null indicator N connected across the secondary $W_s$. Under this condition, the sum of the voltages brought to terminal 30 by resistors $R_1$, $R_2$, $R_3$ and $R_4$ is equal to the sum of the voltages brought to terminal 31 by resistors $R_1'$, $R_2'$, $R_3'$ and $R_4'$.

It will be noted that the connections are arranged to provide the summation called for by Equation 1. Thus, all three of the unknown quantities $X_1$, $X_2$ and $X_3$ are at the left of the equality sign, and with the $S_R$ reversing switches all in their upper positions, as shown, the resistors $R_1$, $R_2$ and $R_3$, from the taps of the unknown potentiometers 4, 5 and 6 are brought to terminal 31. The tap for quantity $M_1$ set up on potentiometer 10 however, is brought to resistor $R_4'$ which goes to the other terminal 30 of the transformer. This is in accord with the equation wherein the $M_1$ quantity is at the righthand side of the equality sign. Thus, the connections are proper to equate the sum of the quantities at the left of the equality sign to the quantity at the right of the equality sign.

In an analogous manner, the resistors $R_1'$, $R_2'$ and $R_3'$ from the ground side of the unknown potentiometers are all brought to terminal 30 of the transformer, while resistor $R_4$ from the ground side of the $M_1$ potentiometer is brought to the opposite terminal 31, thus establishing the equality called for by the equation for the ground side of the system.

If any of the quantities in the equation is a negative value instead of the positive values shown in the equation, this negative sign is easily taken care of by reversing the corresponding $S_R$ switch. Thus, if the coefficient of $X_3$ be a negative number, the switch $S_{R3}$ connected with potentiometer 6 is thrown to the down position, thereby reversing the polarity of the voltages put on the respective resistors $R_3$ and $R_3'$.

As a further refinement of the system, trimmer condensers C are connected across the respective resistances $R_1$, $R_2$, $R_3$ and $R_4$, and $R_1'$, $R_2'$, $R_3'$ and $R_4'$. Adjustment of these trimmer condensers enables the capacity across each of the high resistors R to be made the same.

The total impedances of the potentiometers and resistances are not critical, although the R and R' resistors should be relatively large compared with the resistances of the A, X and M potentiometers, in order to avoid serious errors. It has been found that the following set of values can conveniently be used and preferably they are made to be as close as possible to a pure resistance:

| Potentiometer and Impedance Number | Value of Impedance |
| --- | --- |
| Potentiometers 4, 5, 6 | 1000 ohms, each. |
| Potentiometers 7, 8, 9, 10 | 1000 ohms, each. |
| Resistances $R_1$, $R_2$, $R_3$, $R_4$, $R_1'$, $R_2'$, $R_3'$, $R_4'$ | 500,000 ohms, each. |
| Potentiometer 40 | 1000 ohms. |

The A values can be set up on the respective A potentiometers in any convenient manner. For example, if the voltage of source V be fixed at one volt, and if a voltmeter be connected between ground and each A potentiometer tap, the tap is set so that the proportion of the voltage across the entire potentiometer which lies between ground and the tap is equal to the numerical value of the A in the equation, and this numerical value will be read directly on the meter. For example, if the value of $A_{11}$ be .6291, and if the voltage across potentiometer 7 be one volt, the tap of the potentiometer should be moved so that the voltage between ground and the tap appears on the meter as .6291 volt.

A more convenient and more accurate way of setting up the A quantities, however, is the arrangement shown in Fig. 1 to the right of the broken line Z—Z. This Wheatstone bridge arrangement comprises a potentiometer 40 having the two bridge arms 40a and 40b separated by the tap 41 of the potentiometer. A null indicator $N_2$ is connected to this potentiometer tap and the other side of the null indicator is connected to a selector switch 42 adapted to connect with any one of a series of contacts 43. Each of the selector switch contacts connects to an individual one of the taps of potentiometers 7 to 10. Another selector switch 45 having switch contacts 46 is arranged to select the particular group of A and M potentiometers being used. Thus, the other two arms of the Wheatstone bridge are composed of the portions on either side of the potentiometer tap of whichever of potentiometers 7 to 10 is in circuit. The tap 41 on potentiometer 40 is moved to tap off between ground and tap 41 the amount of the voltage bearing the ratio to the total voltage across the potentiometer 40 which is equal to the particular A number to be set up. If this A number is being set up for example, on potentiometer 7, the selector switch is turned to its uppermost switch point 43, and then the tap of potentiometer 7 is moved until a null reading is had on null indicator $N_2$. This null reading indicates that the voltage on the tap of potentiometer 7 is the same as that on the tap of potentiometer 40 and therefore is the required A value. This same procedure can be followed to set the taps on each of the other potentiometers 8, 9 and 10. As potentiometer 40 is not loaded, its increments of resistance are directly proportional to its increments of voltage. Accordingly, a scale may be placed on potentiometer 40 to read directly the ratio of the voltage on the tap to the total voltage across the potentiometer, and thus read directly the numbers to be set up.

As the X potentiometers are not appreciably loaded (since resistors $R_1$, $R_2$, $R_1'$, $R_2'$, etc., are relatively high) the increments of impedance on these potentiometers are substantially proportional to the increments of voltage. Accordingly, a scale can be fixed to each of these potentiometers on which the position of the tap will read directly the ratio which the voltage from ground to the tap bears to the total voltage across the potentiometer. The X value set up can accordingly be read directly on the scale.

A numerical example showing the way in which solutions for simultaneous equations may be made by the iterative method on the computing system is given as follows, wherein Equations 4, 5 and 6 are the same as the Equations 1, 2 and 3 respectively, but with specific numbers for the known values. The subscript $n$ stands for the equation being considered. Thus when considering the first equation, $A_{n1}$ is $A_{11}$, $A_{n2}$ is $A_{12}$ and $A_{n3}$ is $A_{13}$; and when considering the second equation, $A_{n1}$ is $A_{21}$, $A_{n2}$ is $A_{22}$, etc.

Let the set of equations to be solved be:

$$2.0000\,X_1 + .0390\,X_2 + .0086\,X_3 = .0602 \quad (4)$$
$$0\,X_1 + 3.0000\,X_2 + .1428\,X_3 = 1.2543 \quad (5)$$
$$1.0000\,X_1 + .6341\,X_2 + .1512\,X_3 = .3565 \quad (6)$$

In order to reduce all quantities to unity or less, the first equation may be divided by 2, the second by 3, and the third by 1. These operations give a modified set of equations, which however, are satisfied by the same set of X values as the original set.

$$1.0000\,X_1 + .0195\,X_2 + .0043\,X_3 = .0301 \quad (7)$$
$$0\,X_1 + 1.0000\,X_2 + .0476\,X_3 = .4181 \quad (8)$$
$$1.0000\,X_1 + .6341\,X_2 + .1512\,X_3 = .3565 \quad (9)$$

The following table summarizes the operation of the computer in solving these equations. The first column gives the number of the cycle of operation, one cycle being defined as the process of solving each of the equations once in the manner previously indicated. The second column gives the number of the equation being solved, and the next four columns show the values of the A and M coefficients corresponding to the particular equation. The last three columns give the X approximations existing at that particular point in the operation, and the X which is solved for is underlined. It should be noted that in this example, the solutions were initiated by arbitrarily setting the $X_2$ and $X_3$ potentiometers at zero and then solving for $X_1$.

| Cycle of Operation | Equation Being Solved | A Coefficients | | | $M_n$ | X Approximations | | |
|---|---|---|---|---|---|---|---|---|
| | | $A_{n1}$ | $A_{n2}$ | $A_{n3}$ | | $X_1$ | $X_2$ | $X_3$ |
| 1 | (7) | 1.0000 | .0195 | .0043 | .0301 | .0301 | 0 | 0 |
| | (8) | 0 | 1.0000 | .0476 | .4181 | .0301 | .4181 | 0 |
| | (9) | 1.0000 | .6341 | .1512 | .3565 | .0301 | .4181 | .4090 |
| 2 | (7) | 1.0000 | .0195 | .0043 | .0301 | .0200 | .4181 | .4090 |
| | (8) | 0 | 1.0000 | .0476 | .4181 | .0200 | .3986 | .4090 |
| | (9) | 1.0000 | .6341 | .1512 | .3565 | .0200 | .3986 | .5564 |
| 3 | (7) | 1.0000 | .0195 | .0043 | .0301 | .0200 | .3986 | .5564 |
| | (8) | 0 | 1.0000 | .0476 | .4181 | .0200 | .3916 | .5564 |
| | (9) | 1.0000 | .6341 | .1512 | .3565 | .0200 | .3916 | .5866 |
| 4 | (7) | 1.0000 | .0195 | .0043 | .0301 | .0200 | .3916 | .5866 |
| | (8) | 0 | 1.0000 | .0476 | .4181 | .0200 | .3900 | .5866 |
| | (9) | 1.0000 | .6341 | .1512 | .3565 | .0200 | .3900 | .5900 |

In this particular problem, four cycles of operation were required to reach the final answers which are:

$$X_1 = .0200$$
$$X_2 = .3900$$
$$X_3 = .5900$$

In the foregoing problem, the A and M values set up on the computer are voltage ratios; that is, the coefficient 1.0000 for the $A_{n1}$ value in Equation 7 means that the tap of potentiometer 7 is set at the top of its potentiometer, so as to tap off the entire voltage across the potentiometer; the .0195 value for $A_{n2}$ means that the tap of potentiometer 8 is set at .0195 of the total voltage across potentiometer 8, etc., etc. The final solution, .0200 for $X_1$ was found by ascertaining that after the final cycle of operation, the tap of potentiometer 4 was set on the potentiometer to tap off .0200 of the total voltage across the potentiometer, etc., etc.

In the foregoing example, the particular values in the equations were such that the equations converged rapidly to an ultimate solution; and only four cycles of operation were required to reach these solutions. Many times, however, the values in the equations are such that the equations are "stubborn"; that is, they do not readily converge to a solution even after many cycles of operation. I have found that many such stubborn equations can be solved for with comparative ease by use of the additional circuit elements enclosed in the rectangle G. These additional elements comprise potentiometers $m$ and $K$, potentiometer $m$ (herein called an auxiliary potentiometer) being connected across the voltage source V, and potentiometer K (herein called a subordinate potentiometer) being connected between ground and the adjustable tap 50 of potentiometer $m$. There is associated with potentiometer K a pair of high resistors $R_5$ and $R_5'$, connectable to the potentiometer K through a reversing switch $S_{R5}$. The resistors $R_5$ and $R_5'$ are equal in value to the other R resistors associated with potentiometers 4, 5 and 6, and they are connected to the opposite terminals 30 and 31 of transformer $T_n$ in a similar fashion.

It will be apparent that the potentiometer combination $m$ and K is a voltage multiplying combination connected across voltage source V in the same manner as any of the other multiplying combinations of the system, such as potentiometers 7 and 4, or 8 and 5, etc. Furthermore, the $m$ and K potentiometer combination is connected into the addition system of the R resistors in the same way as any of the other multiplying potentiometer combinations so that the voltage tapped off at the adjustable tap of potentiometer K contributes to the voltage applied across terminals 30 and 31 of transformer $T_n$, in the same proportion as do the voltages from potentiometers 4, 5 and 6.

I am able to facilitate the solution of equations by means of the $m$-K potentiometer combination in the following manner: I compute numerical values for the settings of the tap 51 of the K potentiometer; and there will be one less K value than there are simultaneous equations. Letting $K_2$, $K_3$ ... $K_n$ represent the respective K values for the first, second, third ... nth equations, these can be computed according to the following relations of the known values:

$$K_2 = 1 - \frac{A_{11}A_{22}}{A_{11}A_{22} - A_{21}A_{12}} = 1 - A_{22}\frac{D_1}{D_2} \quad (10)$$

$$K_3 = 1 - A_{33}\frac{A_{11}A_{22} - A_{21}A_{12}}{A_{11}A_{22}A_{33} + A_{12}A_{23}A_{31} + A_{13}A_{32}A_{21} - A_{31}A_{22}A_{13} - A_{21}A_{12}A_{33} - A_{11}A_{23}A_{32}}$$

$$= 1 - A_{33}\frac{D_2}{D_3} \quad (11)$$

where $D_1$ = determinant of the first order leading principal minor
$= A_{11}$ $D_2$ = determinant of the second order leading principal minor
$= A_{11}A_{22} - A_{21}A_{12}$ $D_3$ = determinant of the third order leading principal minor If four equations are to be solved by this method, $K_4$ would be defined by the relationship:

$$K_4 = 1 - A_{44}\frac{D_3}{D_4} \quad (12)$$

where $D_4$ = determinant of the fourth order leading principal minor.

If $n$ equations are to be solved, $K_n$ would be:

$$K_n = 1 - A_{nn}\frac{D_{n-1}}{D_n} \quad (13)$$

The equations can conveniently be solved in the following manner:

I obtain an apparent solution $X_1'$ for $X_1$ from Equation 1, after setting the A and M potentiometers according to their known values, by first placing selector switch $S_1$ in its switch position 1 and setting the $X_2$, $X_3$ and K potentiometers at zero so that no voltage is obtained from them; and I adjust the tap of the $X_1$ potentiometer until the null indicator indicates zero voltage. Under this condition, the following equation is satisfied:

$$A_{11}X_1' = M_1 \text{ or } X_1' = \frac{M_1}{A_{11}} \quad (14)$$

Then the equation selector switch $S_1$ can be moved to position 2 and the tap of the K potentiometer can be moved up to its upper end for a numerical K setting of 1.0000; and with the same value of $X_1'$ retained and no further readjustment of the $X_2$ and $X_3$ potentiometers, I can now adjust the $m$ potentiometer tap until the null voltage indicator again reads zero. Under this condition, the following equation will be satisfied:

$$A_{21}X_1' = M_n - m_2 \quad (15)$$

where $m_2$ is the value tapped off on the $m$ potentiometer. Following this, I set the K potentiometer to the value of $K_2$ determined by Equation 10, with the selector switches still in position 2 and I adjust the $X_2$ potentiometer until the null indicator again reads zero voltage, thereby satisfying the equation:

$$A_{21}X_1' + A_{21}X_2' = M_2 - K_2m_2 \quad (16)$$

where $X_2'$ is an apparent solution for $X_2$. Then I set the selector switches back to position 1 and the K potentiometer back to zero; and by adjustment of the $X_1$ potentiometer 4, I again bring the null indicator to zero thereby satisfying the equation:

$$A_{11}X_1'' + A_{12}X_2' = M_1 \quad (17)$$

where $X_1''$ is a second apparent solution for $X_1$. Up to this point $X_1''$ and $X_2'$ satisfy the first two simultaneous equations, when the $X_3$ potentiometer is set at zero.

Next I set the equation selector switch to position 3 for Equation 3, and I set the K potentiometer to 1.000 and adjust the tap of the $m$ potentiometer until a null voltage is read on the null indicator, while leaving the other potentiometer settings as above. This satisfies the equation:

$$A_{31}X_1'' + A_{32}X_2' = M_3 - m_3 \quad (18)$$

where $m_3$ is the value now set on the $m$ potentiometer. Then I set the K potentiometer to the value of $K_3$ from Equation 11 and by adjusting the $X_3$ potentiometer 6 until a null reading is indicated, I satisfy the equation:

$$A_{31}X_1'' + A_{32}X_2' + A_{33}X_3 = M_3 - K_3m_3 \quad (19)$$

Having thus found the solution for $X_3$, I can readily solve for $X_1$ and $X_2$ by going back to Equations 1 and 2. I do this by leaving potentiometer 6 at its $X_3$ setting, and after moving the selector switch to its position 1, for Equation 1, I again get an $X_1$ value, and with this new $X_1$ value thus set, I get a new $X_2$ value from Equation 2. In this way, I converge the $X_1$ and $X_2$ potentiometers to an ultimate solution.

The step-by-step solution of the following three-equation numerical problem will illustrate the use of the K and $m$ potentiometers. Let the equations be as follows:

$$1.0000X_1 + .7100X_2 + .6650X_3 = .7904$$
$$1.0000X_1 + .8850X_2 + .6400X_3 = .8396$$
$$1.0000X_1 + .9650X_2 + .8370X_3 = .9330$$

The A coefficients are set as resistance ratios on the respective potentiometers. The M terms are not yet set on the respective potentiometers, as the K factors are to be determined first.

Assume $$X_1 = .2000$$
$$X_2 = .2500$$
$$X_3 = .3000$$

Set $K=0$ on the K potentiometer, $X_1=.2000$ on the $X_1$ potentiometer, $X_2=.2500$ on the $X_2$ potentiometer, and $X_3=0$ on the $X_3$ potentiometer. Adjust the first equation:

$$1.0000(.2000) + .7100(.2500) = M_1^{(1)}$$

to a balance with the $M_1$ potentiometer, and the second equation $$1.0000(.2000) + .8859(.2500) = M_2^{(1)}$$

to a balance with the $M_2$ potentiometer; then $$M_1^{(1)} = .3774$$
$$M_2^{(1)} = .4213$$

(The postscript (1) means these are the first values of $M_1$ and $M_2$; similarly the postscripts (1), (2), (3), etc., in the following equations represent the first, second and third values of $X_1$, $M_2$, etc.) With these values for $M_1$ and $M_2$ set $X_2=0$ and balance the first equation $$1.0000X_1^{(1)} = .3774$$

with the $X_1$ potentiometer, giving $$X_1^{(1)} = .3774$$

With this value of $$X_1^{(1)}$$

set on the $X_1$ potentiometer and $K=.1000$ set on the K potentiometer, balance the second equation $$1.0000(.3774) = .4213 - m_2^{(1)}(.1000)$$

with the $m$ potentiometer, giving $$m_2^{(1)} = .0457$$

Set $X_2 = .2500$ on the $X_2$ potentiometer and balance the equation $$1.0000(.3774) + .8850(.2500) = .4213 - (.0457)K_{22}$$

with the K potentiometer, giving $$K_{22} = -.4048$$

By definition, $K_{22}$ is really $$\frac{-.4048}{.1000}$$

as .1000 was the value on the K potentiometer when the $m$ potentiometer was adjusted to obtain $$M_2^{(1)}$$

This procedure is required because numbers greater than 1.0000 cannot be set on a potentiometer.

Set $K=0$ on the K potentiometer, $X_1=.2000$, $X_2=.2500$ and $X_3=.3000$ on the respective potentiometers. Balance the equations $$1.0000(.2000) + .7100(.2500) + .6650(.3000) = M_1^{(2)}$$
$$1.0000(.2000) + .8850(.2500) + .6400(.3000) = M_2^{(2)}$$
$$1.0000(.2000) + .9650(.2500) + .8370(.3000) = M_3^{(2)}$$

with the M potentiometers, giving $$M_1^{(2)} = .5763$$
$$M_2^{(2)} = .6126$$
$$M_3^{(2)} = .6916$$

Using the value of $K_{22}$ just determined, the first two equations of the set are solved with $X_3=0$. To do this, balance the first equation $$1.0000(X_1) + .7100(.2500) = .5763$$

with the $X_1$ potentiometer, giving $$X_1 = .3990$$

Set the $K_{22} = .1000$ and balance the second equation $$1.0000(.3990) + .8850(.2500) = .6126 - m_2^{(2)}(.1000)$$

with the $m$ potentiometer, giving $$m_2^{(2)} = .0804$$

Set the K potentiometer to the value of $K_{22} = -.4048$ and balance the second equation $$1.0000(.3990) + .8850(X_2) = .6126 - (.0804)(-.4048)$$

with the $X_2$ potentiometer, giving $$X_2 = .2066$$

With this value of $X_2$ balance the first equation $$1.0000(X_1) + .7100(.2066) = .5763$$

with the $X_1$ potentiometer, giving $$X_1 = .4296$$

These two values for $X_1$ and $X_2$ satisfy the first two equations of the set with $X_3=0$.

Set the K potentiometer at .1000 and balance the third equation $$1.0000(.4296)+.9650(.2066)=.6916-m_3^{(2)}(.1000)$$

with the $m$ potentiometer, giving $$m_3^{(2)}=.7423$$

Set $X_3=.3000$ in the $X_3$ potentiometer, and balance the third equation $$1.0000(.4296)+.9650(.2066)+\\ .8370(.3000)=.6916-(.7423)K_{33}$$

with the K potentiometer. The value of $K_{33}$ thus obtained is $$K_{33}=-.3022$$

Now that $K_{22}$ and $K_{33}$ have been determined for the matrix coefficients, any other problem involving the same coefficients but different constant terms on the right side of the equations may be solved. To illustrate, consider the problem in which the constant terms are $$M_1=.7904$$
$$M_2=.8396$$
$$M_3=.9330$$

Set these M values on the respective potentiometers, and set the $X_2$ and $X_3$ potentiometers to zero. Solve the first equation of the set $$1.0000(X_1)=.7904$$

with the $X_1$ potentiometer, giving $$X_1^{(1)}=.7904$$

Insert this value of $$X_1^{(1)}$$

in the second equation $$1.0000(.7904)=.8396-m_2^{(1)}(.1000)$$

and balance the equation with the $m$ potentiometer with $K=.1000$ set on the K potentiometer. The value of $$m_2^{(1)}$$

obtained need not be read, but merely left on the potentiometer.

Set in $K_{22}=-.4048$ on the K potentiometer and balance the second equation $$1.0000(.7904)+.8850(X_2)=.8396-m_2^{(1)}(-.4048)$$

with the $X_2$ potentiometer, giving $$X_2^{(2)}=.1450$$

Insert this value for $$X_2^{(2)}$$

in the first equation, with $K=0$, $$1.0000(.7904)+.7100(.1450)=.7904$$

and balance with the $X_1$ potentiometer, giving $$X_1^{(2)}=.5848$$

These values for $$X_1^{(2)} \text{ and } X_2^{(2)}$$

satisfy the first two equations of the set simultaneously with $X_3=0$.

Set $K=.1000$ in the K potentiometer and balance the third equation of the set with the $m$ potentiometer:

$$1.0000(.5848)+.9650(.1450)=.9330-m_3^{(1)}(.1000)$$

$$m_3^{(1)}$$

need not be read, but is left on the $m$ potentiometer. Set $K_{33}=-.3022$ on the K potentiometer and balance the third equation $$1.0000(.5848)+.9650(.1450)+\\ .8370(X_3)=.9330-m_3^{(1)}(-.3022)$$

with the $X_3$ potentiometer, giving $$X_3=.3397$$

Using this value for $X_3$, the first two equations of the set are solved again, using $K_{22}$, giving $$X_1=.3296$$
$$X_2=.3312$$
$$X_3=.3397$$

as the answers to the equations. The exact answers, when solved mathematically are $$X_1=.3300$$
$$X_2=.3300$$
$$X_3=.3400$$

which illustrates the accuracy of my system.

In the routine solution of a set of equations the intermediate values of the unknown factors $$X_1^{(1)}, X_1^{(2)}, X_2^{(2)}$$

etc., and the settings of the $m$ potentiometer need not be read, but only determined and left set on the respective potentiometers until each operation is completed. Using this procedure the above set of equations may be solved in 1 minute after the K's have been determined. To solve the same set of equations using the iterative method requires 3 minutes and 25 cycles of iteration. Although this particular set of equations is stubborn but not impossible to solve by means of the iterative method, it may be solved using the K method in ⅓ as much time. The saving in time becomes greater as the number of equations in the set is made greater.

Following is a tabulation of the solution of the three-equation set. The values set on the X, $m$ and K potentiometers during each operation are listed. The potentiometer that is adjusted in each operation to balance the corresponding equation is indicated by the underlined number. The values of $m$ are set by balancing the equations, and are not read.

| Operation | Equation | $X_1$ | $X_2$ | $X_3$ | $m$ | K |
|---|---|---|---|---|---|---|
| 1 | 1 | .7904 | 0 | 0 | | 0 |
| 2 | 2 | .7904 | 0 | 0 | $m_2^{(1)}$ | .1000 |
| 3 | 2 | .7904 | .1450 | 0 | $m_2^{(1)}$ | -.4048 |
| 4 | 1 | .5848 | .1450 | 0 | | 0 |
| 5 | 3 | .5848 | .1450 | 0 | $m_3^{(1)}$ | .1000 |
| 6 | 3 | .5848 | .1450 | .3397 | $m_3^{(1)}$ | -.3022 |
| 7 | 1 | .4609 | .1450 | .3397 | | 0 |
| 8 | 2 | .4609 | .1450 | .3397 | $m_2^{(2)}$ | .1000 |
| 9 | 2 | .4609 | .3312 | .3397 | $m_2^{(2)}$ | -.4048 |
| 10 | 1 | .3296 | .3312 | .3397 | | 0 |

Although three equations have been used in the foregoing example to illustrate the operation of my system, it will be understood that the K and $m$ potentiometers may be used in solving a greater number than three equations. The number of equations which may be solved will only be limited by the number of A, M and X potentiometers which are used. For example, if it is desired to make the system capable of solving for eight equations, eight of the X potentiometers will be used; and there will be nine of the S position switches each having eight switch positions; and there will be a corresponding number of the A and M potentiometers. Only two K and $m$ potentiometers will be needed regardless of the number of equations. Such a system will then be capable of solving for any number of simultaneous equations up to eight simply by setting at zero the potentiometers corresponding to equations in excess of those actually being solved.

Figure 2:
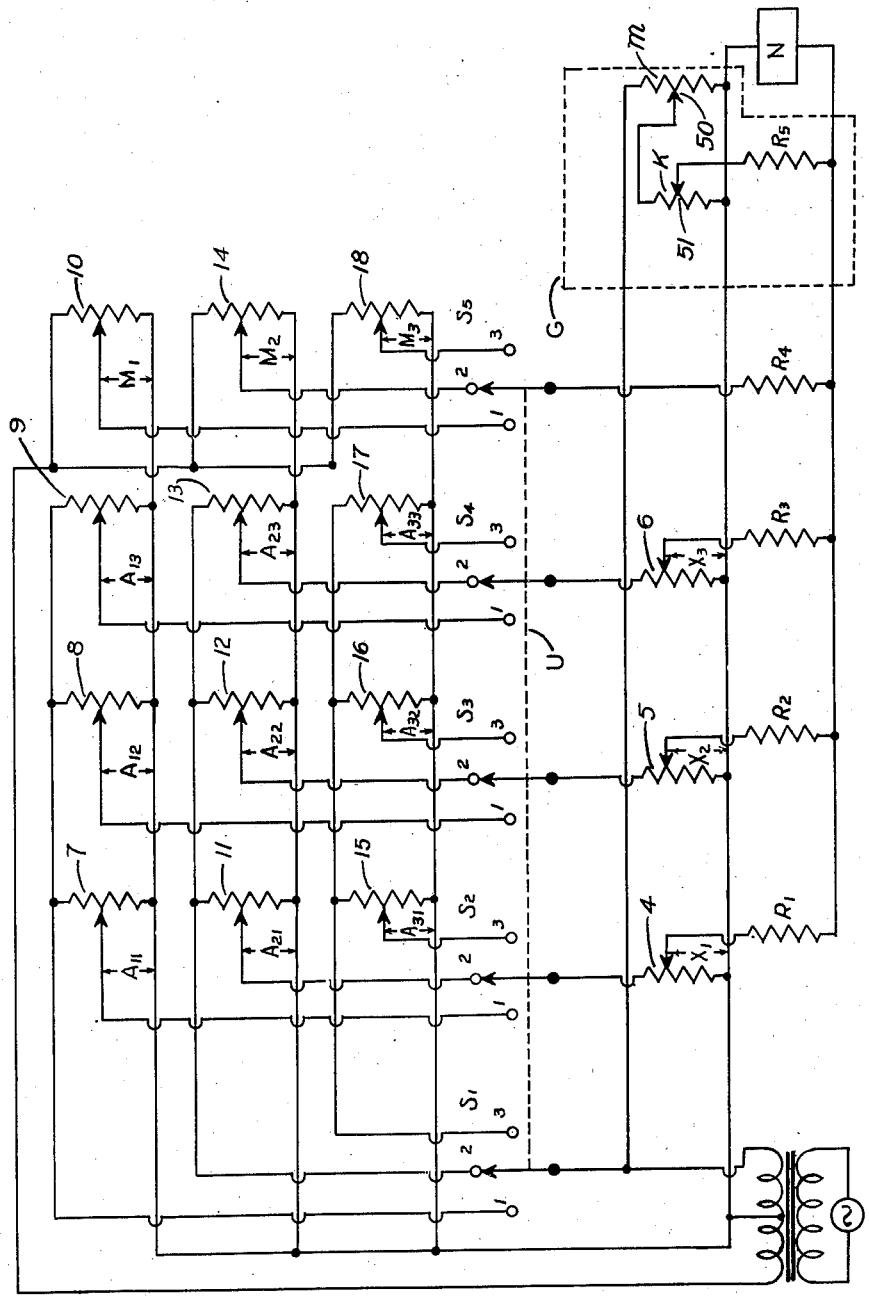
Fig. 2 shows a modified form of computer embodying my invention.

My arrangement of K and m potentiometers is not limited to use with the particular computing system shown in Fig. 1, but may be used also with other forms of electrical computing systems. For example, it may be used with the computing systems arranged in the form disclosed in the copending applications Serial No. 561,192, filed October 31, 1944, and Serial No. 610,457, filed August 13, 1945, in the name of Clifford E. Berry, and assigned to the same assignee as the present application. An example of its use with the Berry system is shown in Fig. 2.

This comprises the same A and M potentiometers 4 to 18 as in Fig. 1, the same numbered elements corresponding to each other in the two figures. The addition system in Fig. 2 is simpler than that in Fig. 1 in that it comprises the equal resistors $R_1$, $R_2$, $R_3$, $R_4$ and $R_5$ corresponding in value and in function to the same designated resistors in Fig. 1. The K and $m$ potentiometer combination enclosed in the dotted rectangle G corresponds with the same elements in the rectangle G of Fig. 1; and aside from the elements in this rectangle, the system in Fig. 2 is the same as in the Berry application. Successive steps in the solutions of the equations are made in the system of Fig. 2 in the same way as described above for the system of Fig. 1.

Figure 3:
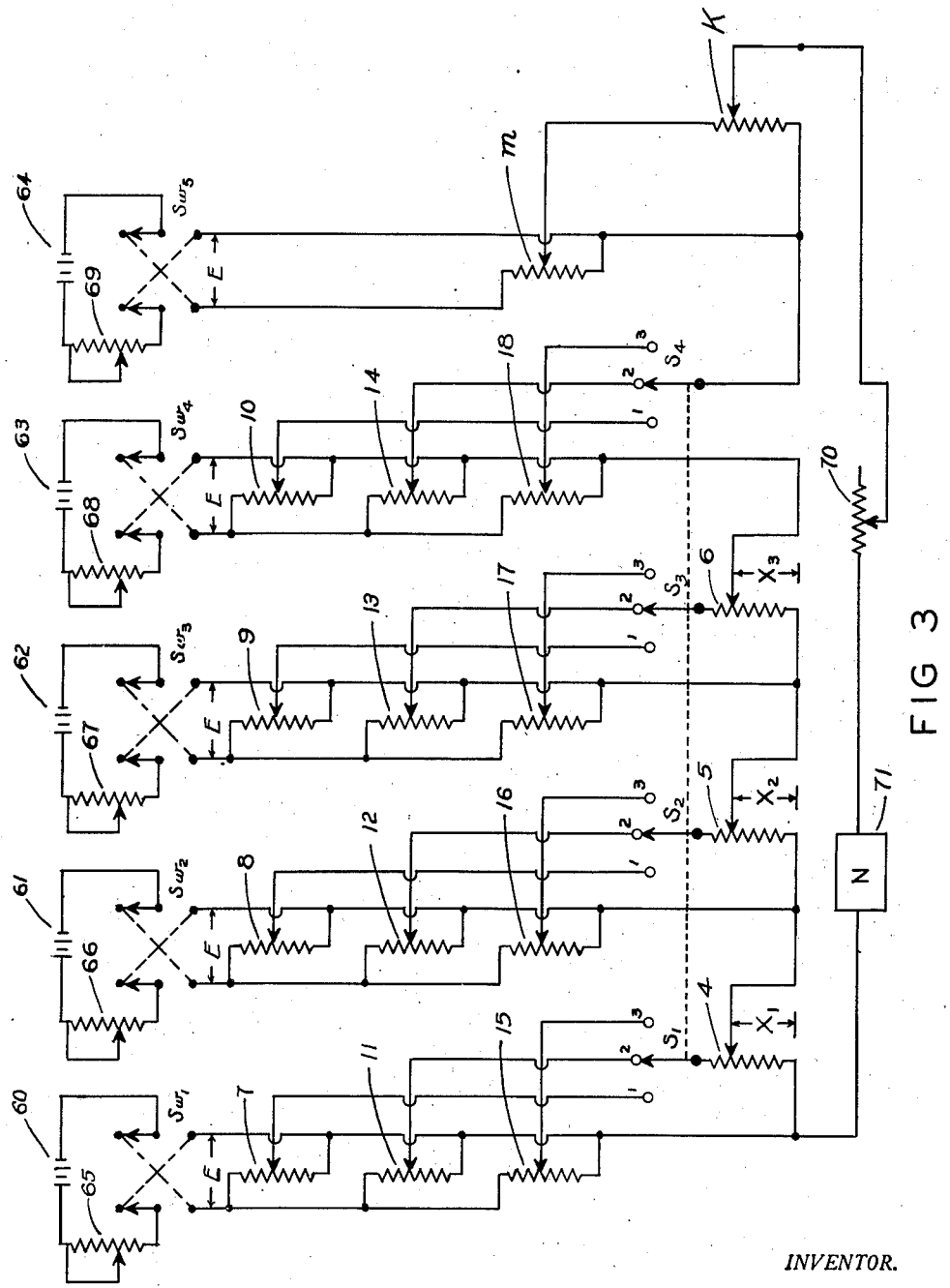
Fig. 3 shows another form of computer embodying my invention.

The $m$-K combination is useful also with computers in which the equation quantities are added by the direct addition of voltages. Fig. 3 shows such a system. The A and M potentiometers 7 to 18 are arranged similarly to the same numbered potentiometers in Figs. 1 and 2, but their source of voltage supply instead of being the alternating voltage source V of Figs. 1 and 2, is an individual D. C. supply. Thus, potentiometers 7, 11 and 15 are supplied by battery 60; potentiometers 8, 12 and 16 by battery 61; potentiometers 9, 13 and 17 by a battery 62, and potentiometers 10, 14 and 18 by a battery 63. Each battery has in series with it an adjustment rheostat, these being numbered 65 to 68 respectively, the purpose of which is to make the voltage E across all the rheostats the same, for example one volt. For the purpose of taking care of the plus and minus signs of the A and M values there are provided respectively reversing switches $S_{w1}$, $S_{w2}$, $S_{w3}$ and $S_{w4}$.

The addition system is a direct addition of voltages at the taps of the X potentiometers 4, 5 and 6. Thus these tapped-off portions of the X potentiometers are connected in series with the null indicator 71, as shown; and to assure the indicator needle being on the scale, there may conveniently be connected also in series a rheostat 70. The null indicator will be of the D. C. type such as an ordinary galvanometer and when it reads zero current, the X and M voltages add up to zero.

The $m$ and K potentiometers are supplied with a voltage source 64, an adjusting potentiometer 69 and a reversing switch $S_{w5}$ in the same manner as the other potentiometers. The voltage tapped off at potentiometer K is included in the series addition system along with the other added voltages so that the voltage of potentiometer K contributes to the summation.

The operation of this type of system is similar to that described above in connection with Fig. 1.

Other uses may be made of my system than the straight-forward solution of equations as described heretofore. For example, there are cases such as in the mass spectrometer analysis of hydrocarbons, wherein many sets of simultaneous equations are encountered wherein the A values are the same, but the M values are different in the several sets. Since the values of $K_2$, $K_3$ . . . $K_n$ are functions only of the A coefficients, the same set of K's can be used for all of the sets of the equations. A convenient way of doing this, is to invert the procedure outlined heretofore for a straight-forward solution of the equations; and instead, starting with a set of equations, the answers of which are known. Thus, by setting up the knowns and unknowns on the respective potentiometers, the values of $K_2$, $K_3$ . . . $K_n$ may successively be determined by adjusting the K potentiometers for a null indication. Having thus determined the K values, they may be used to solve any subsequent set of equations involving the same A coefficients but different M values.

To illustrate the procedure for ascertaining $K_2$ and $K_3$, the computer may be operated as follows:

Assume that $X_1=A$; $X_2=B$, and $X_3=C$. These values are inserted into Equations 1 and 2, which are each satisfied successively by adjusting the $M_1$ and $M_2$ potentiometers for a null indication. Now with the equation selector $S_1$ in position 1, and $X_2$ and $X_3$ both equal to zero, I satisfy Equation 1 by adjustment of the $X_1$ potentiometer. Equation 1 is then:

$$A_{11}X_1' = M_1 \qquad (20)$$

Next I set the selector switch to position 2 and set the K potentiometer at 1.000, and then I adjust the $m$ potentiometer to satisfy the equation:

$$A_{21}X_1' = M_2 - m_2 \qquad (21)$$

Then I set the $X_2$ potentiometer at value B and adjust the K potentiometer to satisfy the equation:

$$A_{21}X_1' + A_{22}B = M_2 - K_2m_2 \qquad (22)$$

This value of $K_2$ which satisfies Equation 22 is the value of $K_2$ expressed in Equation 10.

Then I set the X values A, B and C on the respective X potentiometers and satisfy Equations 1, 2 and 3 by adjusting successively the $M_1$, $M_2$ and $M_3$ potentiometers. Then I set $X_3$ at zero and solve Equations 1 and 2 using the value of $K_2$ just obtained. These solutions give:

$$X_1 = A' \qquad (23)$$

and $$X_2 = B' \qquad (24)$$

where A' and B' are apparent solutions. Then I set the selector switch at position 3 and the K potentiometer at 1.000, and adjust the $m$ potentiometer to satisfy the equation:

$$A_{31}A' + A_{32}B' = M_3 - m_3 \qquad (25)$$

Then after setting $X_3=C$, I adjust the K potentiometer to satisfy the equation:

$$A_{31}A' + A_{32}B' + A_{33}C = M_3 - K_3m_3 \qquad (26)$$

This value of $K_3$ which satisfies Equation 26 is the value of $K_3$ expressed in Equation 11. The values of $K_2$ and $K_3$ determined by this procedure may be used to solve any set of equations involving the same A coefficients from which these values of $K_2$ and $K_3$ are determined.

It will be recognized from the foregoing description that I have provided by my invention a very useful adjunct and method for electrical computers, greatly facilitating the solution of equations in many instances and decreasing the amount of work involved in many kinds of calculations.

My invention is not limited to the particular embodiments described, which are merely illustrative of my invention, and my invention is only limited by the scope of the appended claims.

I claim:

1. In combination in an iterative computer for solving for the unknown components in a plurality of simultaneous equations having additive quantities at least some of which consist of a known component multiplied by an unknown component, the computer being of the type comprising adjustable-tap potentiometers having equal voltages connected across them and whose tapped-off voltages represent the components, those potentiometers corresponding to multiplied components being arranged in multiplying voltage relation in correspondence with the multiplied components, and a system for adding the voltages representing the additive quantities; means for facilitating the solutions comprising an auxiliary adjustable-tap potentiometer adapted to be connected across a voltage similar to the first-mentioned voltages, and a subordinate adjustable-tap potentiometer connected in multiplying relation across the tapped-off portion of the auxiliary potentiometer, and means for including the voltage at the tap of said subordinate potentiometer in said means for adding the voltages.

2. In combination in an iterative computer for solving for the unknown components in a plurality of simultaneous equations having additive quantities at least some of which consist of a known component multiplied by an unknown component, the computer comprising at least as many adjustable-tap potentiometers, adapted to have equal voltages connected across them, as there are additive quantities in an equation, each of said potentiometers corresponding to a component of an additive quantity, and an additional adjustable-tap potentiometer representing the other component of each additive quantity which has both a known and an unknown component, connected across the tapped-off portion of the corresponding one of the first-mentioned potentiometers, and means for adding the voltages at the taps of said additional potentiometers according to the summation of the equations; the improvement which comprises an auxiliary adjustable-tap potentiometer adapted to be connected across a voltage source and a subordinate adjustabe-tap potentiometer connected across the tapped-off portion of the auxiliary potentiometer, the tapped-off voltage of said subordinate potentiometer being included in said means for adding the voltages.

3. In combination in a computer for solving for the unknown components in a plurality of simultaneous equations having additive quantities at least some of which consist of a known component multiplied by an unknown component, the computer comprising a voltage source, a plurality of adjustable-tap potentiometers connected across the voltage source, the ratio of the tapped-off voltage to the total voltage across each potentiometer representing an individual one of the known components, each potentiometer which represents a known component multiplied by an unknown component having connected across its tapped-off voltage an additional adjustable-tap potentiometer the ratio of whose tapped-off voltage to its total voltage represents the unknown component, one terminal of each potentiometer whose tap represents an additive quantity in an equation being connected to a common point and means for adding the voltages at the taps of the last-mentioned potentiometers according to the summation of the equations; the improvement which comprises an auxiliary adjustable-tap potentiometer connected across the voltage source and a subordinate adjustable-tap potentiometer connected across the tapped-off voltage of the auxiliary potentiometer, the tapped-off voltage of said subordinate potentiometer being included in said means for adding the voltages.

4. In combination in a computer for solving the unknown components in a plurality of simultaneous equations having additive quantities at least some of which consist of a known component multiplied by an unknown component, said computer comprising at least as many adjustable-tap potentiometers connected in parallel across a voltage source as there are additive quantities in an equation, there being an individual potentiometer representing each of the multiplied components of an additive quantity, each of the potentiometers which represents one but not the other of the multiplied components of an additive quantity having tapped off from its adjustable tap a portion of its total voltage and having an additional adjustable-tap potentiometer representing the other component of the quantity connected across its tapped-off portion, the voltage at the tap of each of said additional potentiometers being the final voltage representing the respective additive quantity, each of the potentiometers whose tap represents the final voltage of an additive quantity having one of its terminals connected at a common point, and means for adding the voltages representing the additive quantities, said means comprising a resistance in series between each final voltage tap and a common junction and means for indicating null voltage between the common junction and the common point of the potentiometers; the improvement which comprises an auxiliary adjustable-tap potentiometer connected across the voltage source and a subordinate adjustable-tap potentiometer connected across the tapped-off voltage of the auxiliary potentiometer, and a resistance in series between the tap of said subordinate potentiometer and the common junction for including the voltage at the last-mentioned tap in said voltage-adding means.

5. In combination in a computer for solving for the unknown components in a plurality of simultaneous equations having additive quantities at least some of which consist of a known component multiplied by an unknown component, the computer comprising at least as many adjustable-tap potentiometers connected in parallel across a voltage source as there are additive quantities in an equation, there being an individual potentiometer representing each of the multiplied components of an additive quantity, each of the potentiometers which represents one but not the other of the multiplied components of an additive quantity having tapped off from its adjustable tap a portion of its total voltage, and an additional adjustable tap potentiometer representing the other component connected across said tapped-off portion, whereby the ratio of the voltage at the tap of said additional potentiometer to the source voltage represents the multiplied components of the corresponding additive quantity, and means for adding the voltages representing the additive quantities according to the summation of the equations; the improvement which comprises an auxiliary adjustable-tap potentiometer connected across the voltage source and a subordinate adjustable-tap potentiometer connected across the tapped-off voltage of the auxiliary potentiometer, the tapped-off voltage of said subordinate potentiometer being included in said voltage adding means.

6. In combination in an iterative computer for solving for the unknown components in a plurality of simultaneous equations having additive quantities at least some of which consist of a known component multiplied by an unknown component, the computer being of the type comprising adjustable-tap potentiometers having equal voltages connected across them and whose tapped-off voltages represent the components, those potentiometers corresponding to multiplied components being arranged in multiplying voltage relation in correspondence with the multiplied components, and a series circuit system for adding in series the voltages representing the additive quantities; means for facilitating the solutions comprising an auxiliary adjustable-tap potentiometer adapted to be connected across a voltage similar to the first-mentioned voltages and a subordinate adjustable-tap potentiometer connected in multiplying relation across the tapped-off portion of the auxiliary potentiometer, and means for including the voltage at the tap of said subordinate potentiometer in the series circuit system.

DOYLE E. WILCOX.

REFERENCES CITED

The following references are of record in the file of this patent:

UNITED STATES PATENTS

| Number | Name | Date |
|---|---|---|
| 1,893,009 | Ward | Jan. 3, 1933 |
| 2,087,667 | Hedin | July 20, 1937 |
| 2,310,438 | Johnson | Feb. 9, 1943 |
| 2,401,779 | Swartzel | June 11, 1946 |